United States Patent
Yakushiji et al.

[11] Patent Number: 6,139,024
[45] Date of Patent: *Oct. 31, 2000

[54] CYLINDER HEAD GASKET

[75] Inventors: Masato Yakushiji, Kawaguchi; Hitoshi Kodaira, Kuki, both of Japan

[73] Assignee: Marusan Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/774,187

[22] Filed: Dec. 26, 1996

[51] Int. Cl.⁷ .................................................. F02F 11/00
[52] U.S. Cl. .............................................................. 277/592
[58] Field of Search ................................... 277/592, 594, 277/595, FOR 247, FOR 248

[56] References Cited

U.S. PATENT DOCUMENTS

| | | | |
|---|---|---|---|
| 2,070,918 | 2/1937 | Peterson | 277/592 X |
| 2,074,388 | 3/1937 | Gordon | 277/592 X |
| 2,116,000 | 5/1938 | Peterson | 277/592 X |
| 2,753,199 | 7/1956 | Victor | 277/592 |
| 3,784,212 | 1/1974 | Doerfling | 277/592 |
| 4,325,559 | 4/1982 | Czernik et al. | 277/592 |
| 4,826,708 | 5/1989 | Udagawa | 277/592 X |
| 4,834,279 | 5/1989 | McDowell et al. | 277/592 |
| 4,898,396 | 2/1990 | Udagawa | 277/592 |
| 5,122,214 | 6/1992 | Zurfluh et al. | 277/592 X |
| 5,393,076 | 2/1995 | Hagiwara et al. | 277/592 |
| 5,490,681 | 2/1996 | Plunkett et al. | 277/592 |
| 5,582,415 | 12/1996 | Yoshida et al. | 277/592 |

*Primary Examiner*—Anthony Knight
*Assistant Examiner*—Karlena D. Schwing
*Attorney, Agent, or Firm*—Frishauf, Holtz, Goodman, Langer & Chick, P.C.

[57] ABSTRACT

Disclosed is a cylinder head gasket which comprises: plural thin metal plates each having at least cylinder bores and fluid-passing bores being laminated to constitute laminated thin plates; the surfaces of the outermost thin plates of the laminated thin plates being coated with a composite material, respectively; and the surface of at least one of the thin plates adjacent to each other of the laminated thin plates being coated with the composite material to form a coating layer, whereby the adjacent thin plates are laminated with the coating layer sandwiched therebetween.

12 Claims, 4 Drawing Sheets

6,139,024

1

CYLINDER HEAD GASKET

BACKGROUND OF THE INVENTION

This invention relates to a cylinder head gasket interposed between a cylinder head and a cylinder block, particularly to a cylinder head gasket in which plural thin metal plates are laminated.

In the prior art, as a cylinder head gasket to be interposed between a cylinder head and a cylinder block, there have been known various cylinder head gaskets using a single thin metal plate or plural thin metal plates as shown in FIG. 4 to FIG. 6.

In known cylinder head gasket in which plural thin metal plates are laminated as shown in FIG. 4 and FIG. 5, the total height of the cylinder head gasket can be regulated by the number of thin plates thereof, and a member for heightening sealing property at combustion room bores and fluid bores piercing the gasket can be provided extremely easily at said bores, whereby the gasket has excellent advantages as compared with a cylinder head gasket constituted by a single thin plate described above.

Moreover, in the case where a coating layer of a rubber type or resin type material is provided on the contacting surface of the above gasket in which thin plates are laminated, the gasket has an advantage that when contact pressure with a high load is applied to the laminated thin plates, the laminated thin plates can be deformed by compression because of this coating layer and can be also conformed easily to deformation of a cylinder head or a cylinder block.

For the purpose of preventing fretting and also for the purpose of improving microsealing property, a coating layer is formed not only on the above contacting surface but also on the surface of a thin plate to be contacted with a cylinder head or a cylinder block.

As such a gasket in which thin metal plates are laminated, there has been known a gasket in which coating layers 12 of a rubber type material are provided on the surfaces of laminated thin plates 10 and 11 and on the contacting surface thereof (FIG. 4); or a gasket in which a coating layer is not provided on the contacting surfaces of laminated thin plates 13 to 18, the thin plates 13 to 18 are merely laminated, and a coating layer 19 of a resin type material is provided only on the surface of the outermost thin plate 13 (FIG. 5).

However, when a rubber type material is used for a coating layer, if contact pressure with a high load is applied to, flow breaking or peeling of a coating layer occurs. When a resin type material is used for a coating layer, there are problems that from the standpoint of productivity, it is difficult to form a coating layer so as to have a desired thickness and a creep phenomenon is caused easily by thermal influence. Further, when a coating layer is not applied to the contacting surface of a gasket in which thin plates are laminated, there is a problem that the thin plates do not conform to the deformations of a cylinder head or cylinder block, and therefore such a laminate cannot function as a gasket therefore.

On the other hand, in the prior art, there has been known a gasket in which a composite material, i.e., a material comprising a rubber material, a filler, an organic fiber, an inorganic fiber and the like, is used in place of a rubber type or resin type material to be used for the above coating layer. In the gasket, a coating layer is constituted by such a composite material, and as shown in FIG. 6, coating layers 21 of the composite material are provided on both surfaces of a single thin plate 20.

2

This gasket has mechanical strength and durability against flow breaking, peeling or creep. However, the gasket does not comprise laminated thin plates so that it does not have the above excellent advantages which can be obtained by lamination.

SUMMARY OF THE INVENTION

An object of the present invention is to provide a cylinder head gasket having sufficient mechanical strength and excellent durability while exhibiting advantages which can be obtained by laminating thin plates and providing coating layers on the contacting surfaces of laminated thin plates.

Another object of the present invention is to provide a cylinder head gasket in which the total height or thickness of the gasket itself is suppressed by changing the thickness of coating layers provided on thin plates depending on members with which the coating layers are contacted, a mechanical creep phenomenon is not caused even when a high load is applied, and durability is improved.

In order to achieve the above objects of the present invention, the cylinder head gasket of the first embodiment of the present invention comprises plural thin metal plates each having at least cylinder bores and fluid-passing bores being laminated to constitute laminated thin plates; the surfaces of the outermost thin plates of the laminated thin plates being coated with a composite material, respectively; and the surface of at least one of the thin plates adjacent to each other of the laminated thin plates being coated with the composite material to form a coating layer, whereby the adjacent thin plates are laminated with the coating layer sandwiched therebetween.

Also, in order to achieve the above objects of the present invention, the cylinder head gasket of another embodiment of the present invention comprises a number of thin metal plates each having at least cylinder bores and fluid-passing bores and which are laminated to form a structure of laminated thin plates. The surfaces of the outermost thin plates of the laminated thin plates are being coated with a composite material, respectively; and the surface of at least one of the thin plates adjacent to each other of the laminated thin plates are coated with the composite material to form a coating layer, whereby the adjacent thin plates are laminated with the coating layer sandwiched therebetween. In addition each of the coating layers on the surfaces of the outermost thin plates is formed so as to be thicker than the coating layer formed between the adjacent thin plates.

The cylinder head gasket of a further embodiment of the present invention comprises plural thin metal plates each having at least cylinder bores and fluid-passing bores and which are laminated to form a structure of laminated thin plates; the surfaces of the outermost thin plates of the laminated thin plates being coated with a composite material containing a fiber in addition to a binder and a filler, respectively; and the surface of at least one of the thin plates adjacent to each other of the laminated thin plates being coated with the composite material to form a coating layer, whereby the adjacent thin plates are laminated with the coating layer sandwiched therebetween. Furthermore, each of the coating layers on the surfaces of the outermost thin plates is formed so as to be thicker than the coating layer formed between the adjacent thin plates.

The cylinder head gasket of the second embodiment of the present invention comprises the cylinder head gasket of the above first embodiment, another embodiment or further embodiment, wherein beads surrounding the fluid-passing bores are formed only on the intermediate thin plates and not on the outermost thin plates among the thin plates constituting the laminated thin plates.

DESCRIPTION OF THE PREFERRED EMBODIMENTS

As the thin metal plates, not only surface-treated steel plates but also, for example, aluminum or stainless steel plates may be used. The composite material comprises a rubber material such as nitrile rubber and chloroprene rubber, a filler such as graphite and mica, an inorganic fiber such as glass fiber and an organic fiber such as aromatic polyamide fiber and aromatic polyimide fiber. Thus, in the cylinder head gasket of the present invention, the total height of the cylinder head gasket, a cylinder head and a cylinder block can be regulated; a member for heightening sealing property can be provided extremely easily; when contact pressure with a high load is applied to, the laminated thin plates can be conformed to deformation of a cylinder head or a cylinder block because of the coating layers and also flow breaking or peeling of the coating layers does not occur; and a creep phenomenon is not caused by thermal influence.

Thus, in the cylinder head gasket of the present invention, both of the outermost thick coating layers are in contact with the juxtaposed surfaces of a cylinder head and a cylinder block to absorb roughness of the surfaces. The thickness of the coating layer(s) is prevented from being unnecessarily great by making the coating layer(s) between the layer thin, but with sufficient thickness to retain airtightness between the plates. The total height of the gasket itself is thereby suppressed, and even when a high load is applied mechanical creep phenomenon is not caused.

Examples of the embodiment of the present invention are explained by referring to FIG. 1 to FIG. 3c.

Figure 1:
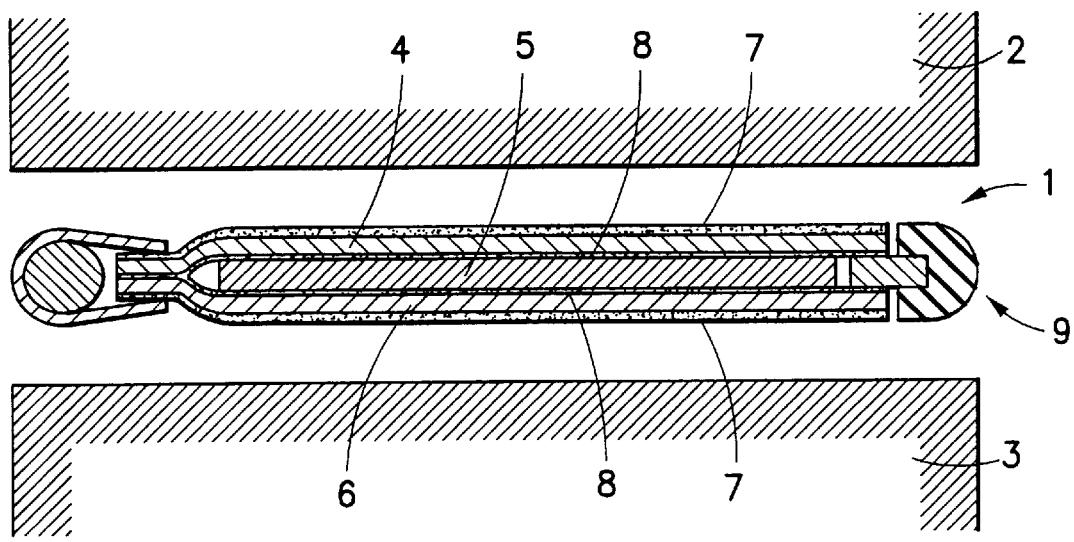
FIG. 1 is a cross-sectional view of a cylinder head gasket according to the embodiment of the present invention.
Figure 2:
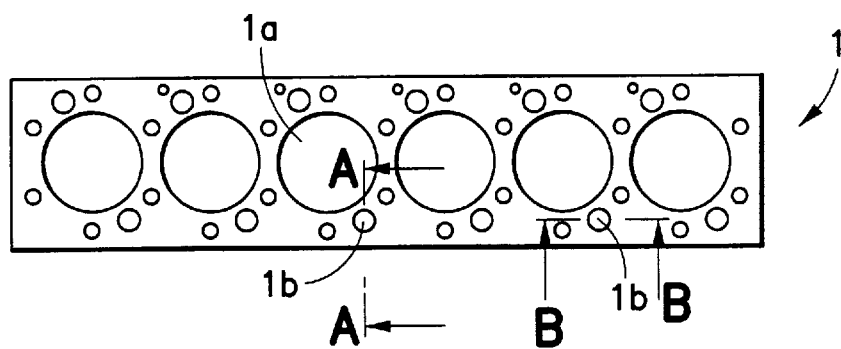
FIG. 2 is a plan view of the gasket of FIG. 1.
Figure 3A:
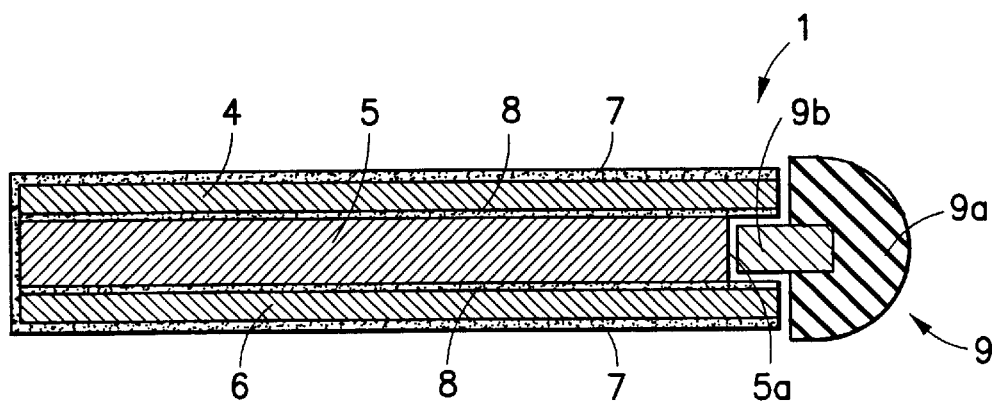
FIG. 3a is an enlarged sectional view of an A—A section in FIG. 2.
Figure 3B:
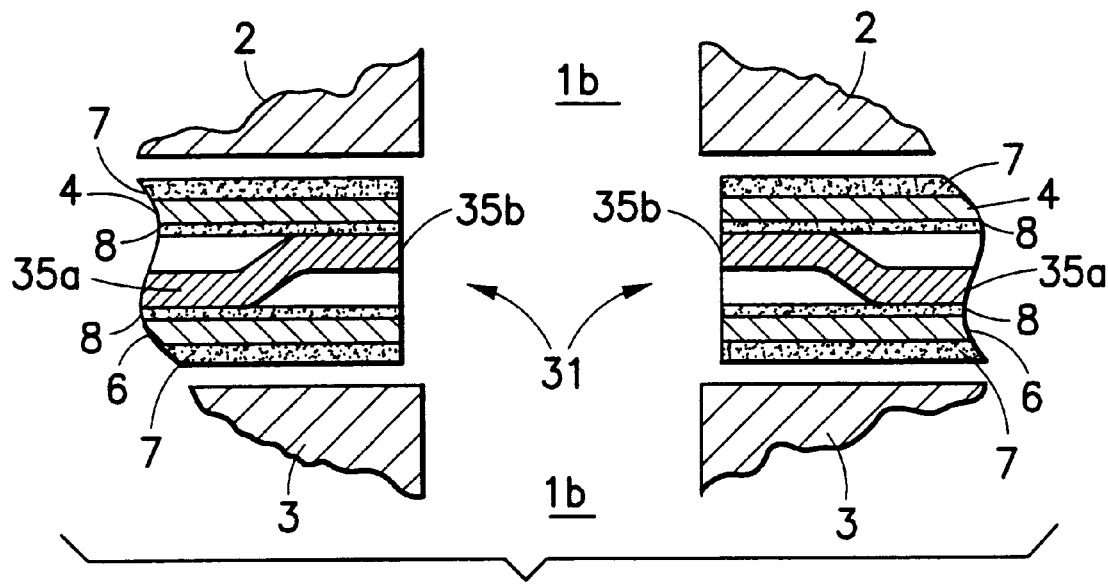
FIG. 3b and FIG. 3c are each an enlarged sectional view of a B—B section in the gasket plan view with different embodiments shown in FIG. 2.
Figure 3C:
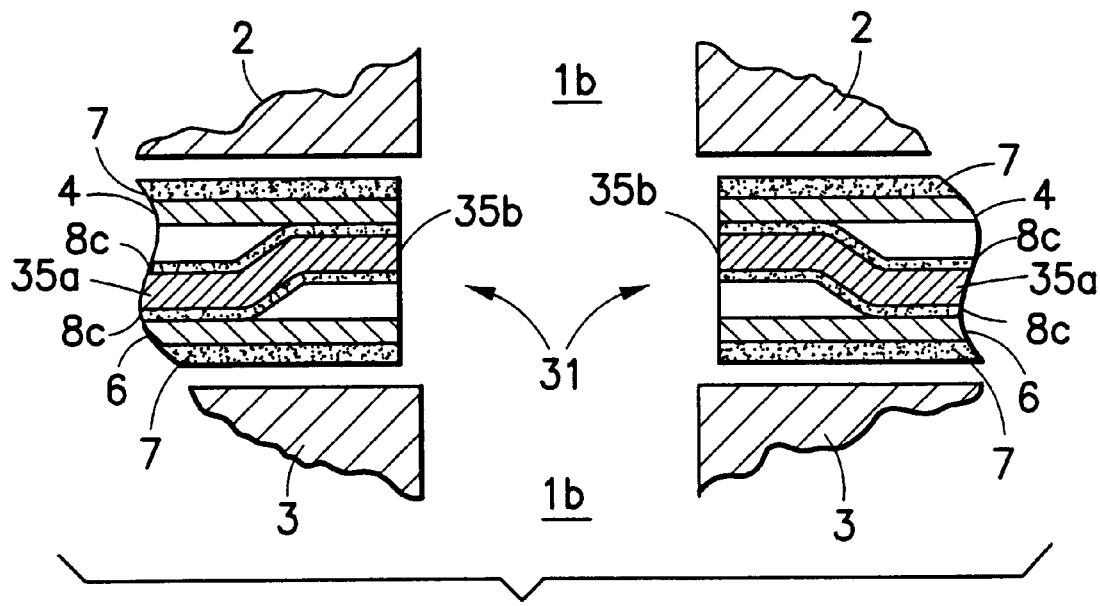

A cylinder head gasket 1 (hereinafter abbreviated to as "gasket 1") according to the first embodiment of the present invention is to be interposed between a cylinder head 2 (hereinafter abbreviated to as "head 2") and a cylinder block 3 (hereinafter abbreviated to as "block 3"). FIG. 1 is a cross-sectional view thereof. FIG. 2 is a plan view of the gasket 1; FIG. 3a is an enlarged sectional view of an A—A section of the gasket 1 of FIG. 2; and FIG. 3b and FIG. 3c are each an enlarged sectional view of a B—B section of the gasket 1 of FIG. 2 showing different embodiments.

The gasket 1 is formed by laminating three surface-treated thin steel plates 4 to 6. On the outer surfaces of the outermost thin plates 4 and 6 among the thin plates, i.e., at the sides of the surfaces contacting with the head 2 and the block 3, coating layers 7 having a desired thickness of 70 to 200 $\mu$m of a composite material are coated, respectively. Also, on the back surfaces of the thin plates 4 and 6, i.e., at the sides of the surfaces adjacent to the thin plate 5, coating layers 8 having a desired thickness of 60 to 100 $\mu$m of the same kind of the above composite material are provided, respectively. In FIG. 1, the above coating layers 7 are formed so as to have the same thickness as that of the coating layers 8.

In this case, the thicknesses of the coating layers 7 and 8 should be selected variously in consideration of not only precisions of surface roughness of the thin plates 4 to 6 themselves constituting the gasket 1 and surface roughness of the head 2 and the block 3 but also conditions of use of the gasket 1. In general, the thickness of the coating layers 7 is preferably 100 $\mu$m or more, and that of the coating layers 8 is preferably 100 $\mu$m or less.

In FIG. 1, the case where the coating layers 7 having the same thickness are formed on the outer surfaces of the thin late 4 and the thin plate 6 is illustrated, but the resent invention is not limited thereby. The coating layers 7 may be formed so that they are different in thickness depending on surface roughness or the like of the head 2 and the block 3.

Also, the case where the coating layers 8 are formed on the back surfaces of the thin plates 4 and 6 is illustrated, but the present invention is not limited thereby. The coating layers 8 may be formed on both surfaces of the thin plate 5 in place of the back surfaces of the thin plates 4 and 6, or the coating layers 8 may be formed on the back surfaces of the thin plates 4 and 6 and both surfaces of the thin plate 5, respectively, so that the coating layers 8 has a total thickness of 60 $\mu$m or less.

One example of main constitutional components of the composite material for coating used in the embodiment of the present invention are shown below.

Filler: preferably 40 to 85% by weight, more preferably bout 60% by weight based on the total weight of the composite material
one or more of kaolin, silica, mica and antigorite
average particle size; preferably 1 to 50 $\mu$m, more preferably about 10 $\mu$m Binder: preferably 5 to 30% by weight, more preferably about 20% by weight based on the total weight of the composite material
nitrile rubber, butadiene-acrylonitrile rubber (NBR) or chloroprene rubber
content of acrylonitrile in the binder;
preferably 20 to 50% by weight, more preferably about 33 to 35% by weight Fiber: preferably 10 to 40% by weight, more preferably about 20% by weight based on the total weight of the composite material
one or more of aromatic polyamide fiber, asbestos and rock wool The gasket 1 as described above is constituted by the laminated thin plates 4 to 6, whereby the total height of the gasket 1, the head 2 and the block 3 can be regulated. Additionally, even when a high load is applied to and the gasket 1 is interposed between the head 2 and the block 3, the coating layers 8 are provided on the contacting surface of the laminated thin plates 4 and 5 and that of the laminated thin plates 5 and 6 so that the gasket 1 can be conformed to deformation of the head 2 or the block 3. Moreover, the composite material is used for the coating layers 7 and 8 so that flow breaking or peeling of the coating layers 7 and 8 does not occur and a creep phenomenon is not caused by thermal influence from the block 3 or the like. Further, in the gasket 1, the coating layers 7 and the coating layers 8 are prevented from being formed to have an unnecessary thickness by absorbing surface roughness of the surfaces contacting with counterpart members between which the gasket 1 is interposed, i.e., the head 2 and the block 3 by the coating layers 7 and retaining airtightness between the thin plates 4 to 6 by the coating layers 8 which are thinner than the coating layers 7, whereby the total height of the gasket 1 itself can be suppressed; even when a high load is applied to, a mechanical creep phenomenon is not caused; and durability is obtained.

As shown in FIG. 2, in the cylinder head gasket 1, plural combustion room bores 1a or fluid-passing bores 1b are pierced, and in order to prevent leakage of a combustion gas, cooling water and the like, a member for heightening sealing property (e.g., an O-ring and a mandrel) is generally provided externally at the circumferential edges of the bores 1a or 1b.

Thus, in the gasket 1 of the present invention in which thin metal plates are laminated, the above member can be provided extremely easily as compared with a gasket constituted by a single thin plate described above.

In the embodiment shown in FIG. 3a that the member for heightening sealing property is provided externally, along the circumferential edge of the fluid-passing bore 1b piercing the three laminated thin plates 4 to 6, a concave portion 5a is formed at the thin plate 5 which is an intermediate layer, whereby a member 9 (composed of 9a and 9b) for heightening sealing property can be engaged with the concave portion 5a.

That is, the member 9 comprises an O-ring 9a made of rubber and a mandrel 9b for reinforcing the ring 9a which are molded integrally, and the mandrel 9b is engaged with the concave portion 5a. Thus, there can be obtained the gasket 1 having mechanical strength and durability against flow breaking, peeling or creep, in which the member 9 for heightening sealing property of the combustion room bores 1a or the fluid-passing bores 1b can be provided extremely easily.

A cylinder head gasket 31 according to the second embodiment of the present invention is also to be interposed between the cylinder head 2 and the cylinder block 3, and a plan shape thereof is the same as shown in FIG. 2. FIG. 3b and FIG. 3c are each an enlarged sectional view of a B—B section of FIG. 2.

The gasket 31 having a sectional constitution shown in FIG. 3b or FIG. 3c is the same as the gasket of FIG. 3a in that the gasket 31 is constituted by laminating three surface-treated steel thin plates 4, 35a and 6.

However, the gasket 31 shown in FIG. 3b or FIG. 3c is different from the gasket of FIG. 3a in the following points. That is, the gasket 1 of FIG. 3a showing the first embodiment of the present invention has a constitution that in order to prevent leakage of a combustion gas, cooling water and the like, the member 9 for heightening sealing property, for example, the O-ring 9a and the mandrel 9b are provided externally at the circumferential edges of the plural combustion room bores 1a or the plural fluid-passing bores 1b. However, external provision of the member 9 for heightening sealing property requires additional processing step(s) for such provision.

Figure 4:
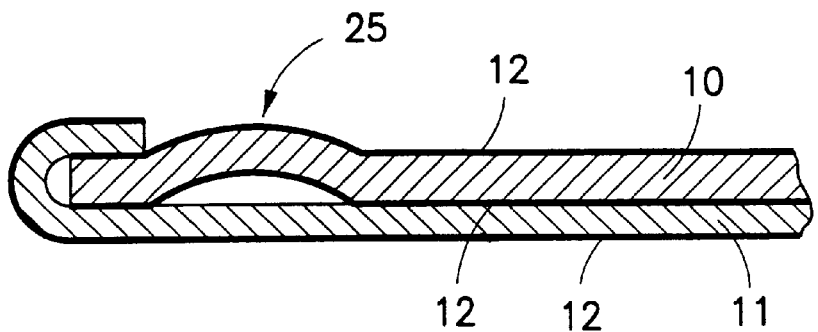
FIG. 4 is a sectional view of a conventional cylinder head gasket in which thin metal plates are laminated.
Figure 5:
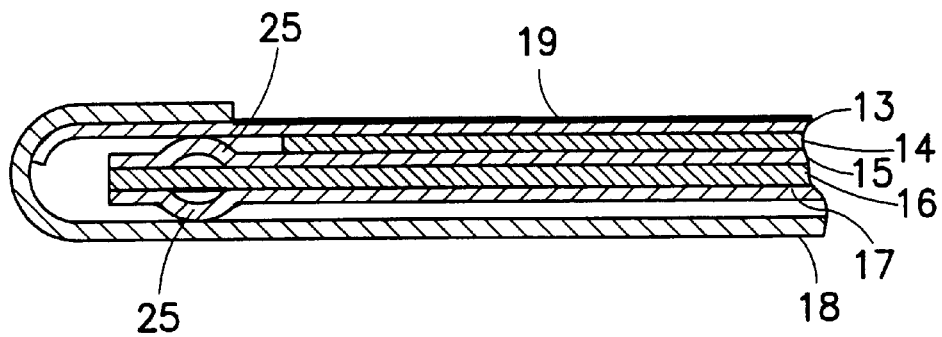
FIG. 5 is a sectional view of a conventional cylinder head gasket in which thin metal plates are laminated.
Figure 6:
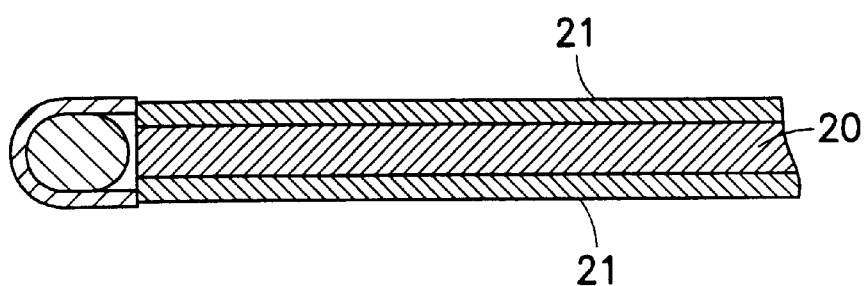
FIG. 6 is a sectional view of a conventional cylinder head gasket in which a conventional composite material is coated.

When a surface-coating layer having a sufficient thickness cannot be provided, as a method in which an externally provided sealing member is not used, there may be mentioned a conventional technique that a bead-processed portion 25 is provided in order to form local sealing stress at a portion contacting with a counterpart flange surface, as shown in FIG. 4 and 5. In that case, there is a problem that peeling or abrasion of a coating layer at the bead-processed portion 25 occurs.

Thus, in the second embodiment of the present invention, bead processing is applied based on an inventive finding that by a coating layer of a surface contacting with a counterpart flange having a sufficient thickness and also making thinner a coating layer of an intermediate contacting surface to which bead processing is to be applied, necessary sealing stress can be formed at the surface contacting with the counterpart flange by subjecting only the intermediate layer to bead processing. FIG. 3b shows an embodiment that a bead-processed portion 35b is provided only at an intermediate layer 35a, and the coating layers 7 and 8 are provided on both surfaces of the outer thin plates 4 and 6. FIG. 3c shows an embodiment that a bead-processed portion 35b is provided only at an intermediate layer 35a, and the coating layers 8c are provided on both surfaces of the intermediate layer 35a. The embodiment that coating layers 8c are coated on both surfaces of the intermediate layer 35a illustrated in FIG. 3c is not limited to such constitution, and the coating layer 8c may be provided only on either surface of the intermediate layer 35a, and coating may be applied to a side facing to a thin plate adjacent to a surface which is not coated.

In the embodiment of the present invention, the gasket 1 constituted by laminating the three thin steel plates 4 to 6, which is considered to be used most frequently from the standpoints of productivity and cost is explained. However, as a matter of course, four or more thin plates may be laminated depending on conditions under which a gasket is used.

EXAMPLE

Onto one surface of a surface-treated steel plate is coated a composite material (trade name: 4840AH-2, available from Asktechnika Corporation, Japan) with a dried thickness of 120 $\mu$m. The composite material comprises 60% by weight of a filler composed of a mixture of silica, kaolin and mica (i.e., 20% by weight of silica, 30% by weight of kaolin and 10% by weight of mica); 20% by weight of a binder (butadiene-acrylonitrile rubber: acrylonitrile content in the binder of 35% by weight) and 20% by weight of a fiber composed of a mixture of an aromatic polyamide fiber and rock wool with a weight ratio of 1:1. Next, onto the back surface of the above steel plate is coated the same composite material with a dried thickness of 80 $\mu$m. This both-surface coated steel plate is subjected to blanking with a blanking press with a predetermined shape to have cylinder bores and fluid-passing bores. Separately, a stainless plate to which the same blanking treatment as mentioned above is subjected and a part of blanking bores is subjected to beading treatment is prepared. This beading-treated steel plate is sandwiched between two sheets of the above both-surface coated steel plates so that the thicker coating layers of the respective both-surface coated steel plates are positioned at the outermost surface of the laminated plates to prepare a cylinder head gasket of the present invention. To a part of the blanking bores is attached an O-ring to obtain a final product.

When this cylinder head gasket thus prepared is fitted to an automobile engine and leakage of a material from bores is examined, no leakage of water nor oil is observed.

Figure 7:
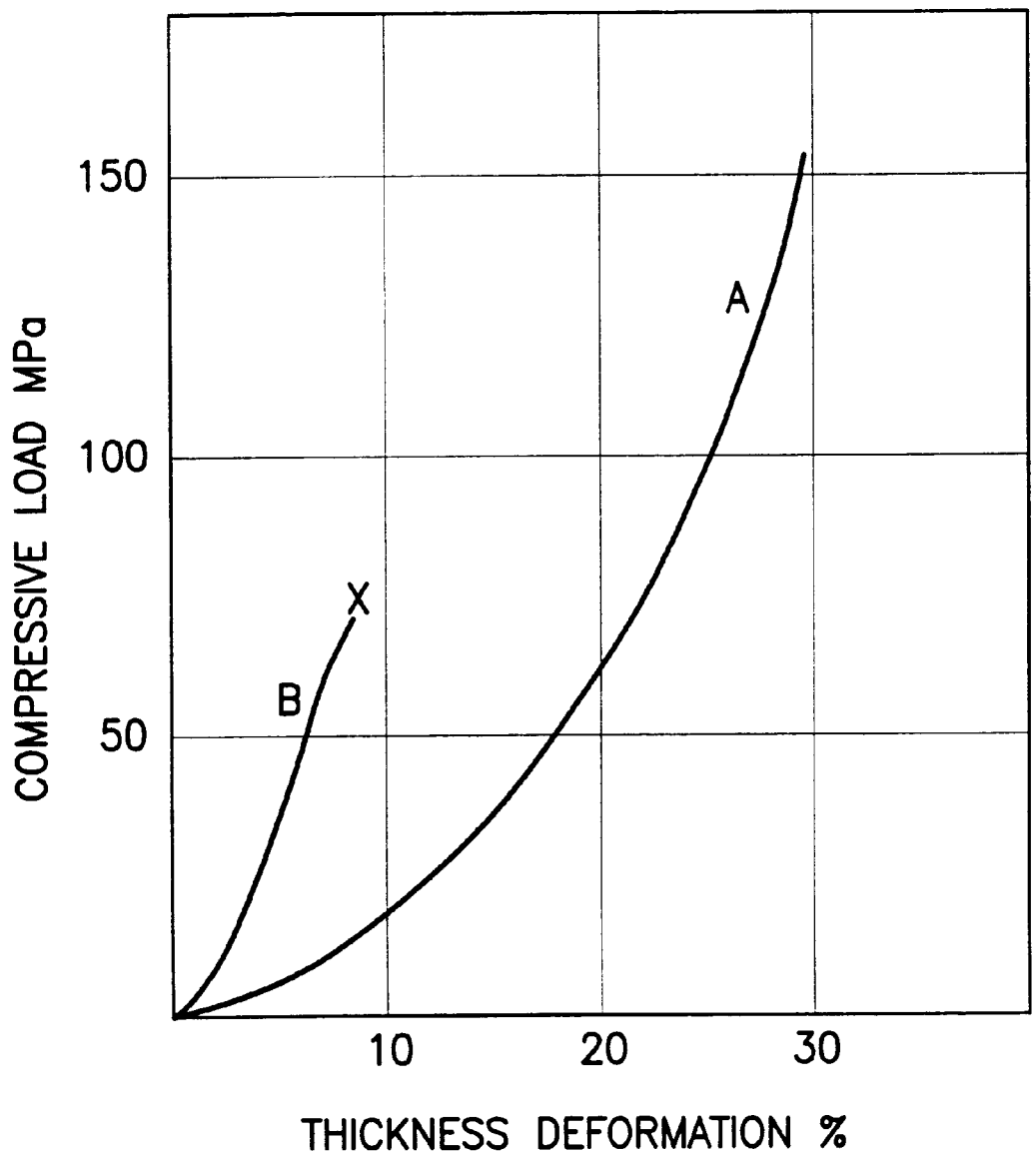
FIG. 7 is a graph showing pressure-resistant characteristics of the composite material of the present invention and a conventional composite material.

The results of a test for comparing pressure-resistant characteristic (Curve A) of the above composite material according to the present invention with pressure-resistant characteristic (curve B) of a conventional composite material is shown in FIG. 7.

Size of test strips: 5×15 mm

Pre-treatment conditions of test strips:

Test strips were dipped in a long life coolant diluted with 50% tap water heated at 100° C., for 1 hour.

Test method:

The test strips were placed on a platen of a material compression tester Autograph DSS-25T (trade name) produced by Shimadzu Seisakusho and compressed by a compression jig having a size of about 30 mm in diameter. The compression rate was 0.5 mm/min.

As can be clearly seen from curve A of FIG. 7, the composite material of the present invention could stand a compressive load exceeding 150 Mega pascal (MPa) and allow thickness deformation exceeding 30%. However, as shown in Curve B, the conventional composite material was crushed when applying a compressive load of 75 MPa which was a half of the above compressive load. This crush point was thickness deformation of less than 10%. The crush point is marked with "X" in FIG. 7.

According to the cylinder head gasket of the present invention, when contact pressure with a high load is applied to, the gasket can be conformed to deformation of a cylinder head or a cylinder block due to the coating layers, flow breaking or peeling of the coating layers does not occur, and a creep phenomenon is not caused by thermal influence.

Further, according to the cylinder head gasket of the present invention, roughness of the processed surfaces of counterpart members can be absorbed, and the coating layers are formed so that airtightness between the thin plates can be retained, whereby the total height of the gasket itself can be suppressed, and even when a high load is applied to, a mechanical creep phenomenon of the coating layers does not occur, and durability is improved.

What is claimed is:

1. A cylinder head gasket which comprises:

plural thin metal plates (4,5,6) including two flat outermost thin metal plates (4,6) having inner and outer surfaces; and at least one inner thin metal plate (5), having first and second surfaces, sandwiched between the inner surfaces of the two outermost thin metal plates (4,6), each of said plural thin metal plates (4,5,6) having at least cylinder bores and fluid-passing bores, and being laminated to form a structure of laminated thin plates;

the inner and outer surfaces of each of said two outermost thin metal plates (4,6) of the laminated plural thin metal plates being substantially fully coated with a composite material to form uniform thickness coating layers (7,8); and the first and second surfaces of the inner thin metal plate (5 or 35a) being not coated with the composite material so that adjacent sides of respective thin metal plates (4 and 6) are laminated with a single coating layer (8) sandwiched therebetween.

2. The gasket according to claim 1, further comprising bead-processed end portions (35b) surrounding the fluid-passing bores 1(b) said bead-processed end portions (35b) being formed only on said inner thin metal plates.

3. The gasket according to claim 1, wherein said composite material comprises

40–85% by weight of the composite material of a filler which is at least one selected from the group consisting of kaolin, silica, mica and antigorite;

5 to 30% by weight of the composite material of a binder selected from the group consisting of nitrile rubber, butadiene-acrylonitrile rubber, and chloroprene rubber; and 10 to 40% by weight of the composite material of at least one selected from the group consisting of aromatic polyamide fiber, asbestos and rock wool.

4. The gasket according to claim 3, wherein said composite material comprises about 60% by weight of said filler; about 20% by weight of said binder; and about 20% by weight of said aromatic polyamide fiber.

5. The gasket according to claim 3, wherein the coating layer (7) on the surfaces of the outermost thin metal plates (4,6) is at least 100 $\mu$m in thickness and the coating layer (8) between respective adjacent thin metal plates is up to 100 $\mu$m in thickness.

6. A cylinder head gasket which comprises:

plural thin metal plates including two flat outermost thin metal plates (4,6) having inner and outer surfaces; and at least one inner thin metal plate (5), having first and second surfaces, sandwiched between the inner surfaces of the two outermost thin metal plates (4,6), each of said plural thin metal plates having at least cylinder bores and fluid-passing bores, and being laminated to form a structure of laminated thin plates;

the inner and outer surfaces of each of said two outermost thin metal plates (4,6) of the laminated plural thin metal plates being coated with a composite material (7) to form a uniform coating layer;

the first and second surfaces of the inner thin metal plate (5) being not coated with the composite material so that adjacent sides of respective thin metal plates are laminated with a single coating layer (8) sandwiched therebetween, and each of the coating layers (7) on the surfaces of the outermost thin metal plates (4,6) is formed thicker than the coating layer (8) formed between respective adjacent thin metal plates or intermediate layer.

7. The gasket according to claim 6, further comprising beads (35b) surrounding the fluid-passing bores (1b), said beads being formed only on inner thin metal plate (35a).

8. The gasket according to claim 6, wherein the coating layer (7) on the surfaces of the outermost thin metal plates (4,6) is at least 100 $\mu$m in thickness and the coating layer (8) between said respective adjacent thin metal plates (4,6) is up to 100 $\mu$m in thickness.

9. A cylinder head gasket which comprises:

plural thin metal plates including two flat outermost thin metal plates (4,6) having inner and outer surfaces; and at least one inner plate, having first and second surfaces sandwiched between the inner surfaces of the outermost plates, each of said thin metal plates having at least cylinder bores and fluid-passing bores, said plural thin metal plates being laminated to form a structure of laminated thin plates;

at least inner and outer surfaces of each said outermost thin metal plates (4,6) of the laminated thin plates being substantially fully coated with a composite material containing a binder and a filler;

the first and second surfaces of said inner thin metal plate (5 or 35a) being not coated with the composite material so that adjacent sides of respective thin metal plates are laminated with a single coating layer sandwiched therebetween, and each of said coating layers on the outer surfaces of the outermost thin metal plates is formed thicker than the coating layer formed between said adjacent thin plates.

10. The gasket according to claim 9, further comprising beads surrounding the fluid-passing bores, said beads being formed only on said inner thin metal plate.

11. A cylinder head gasket which comprises:

three thin metal plates including two flat outermost thin metal plates (4,6) and, sandwiched therebetween, an inner thin metal plate, each having at least cylinder bores, said thin metal plates being laminated to form a structure of laminated thin metal plates;

inner and outer surfaces of each of said outermost thin metal plates (4,6) being substantially fully coated with a composite material containing a fiber, a binder and a filler; and the inner thin metal plate having surfaces which are not coated with composite material, so that said adjacent respective thin metal plates are laminated with a single coating layer sandwiched therebetween.

12. The gasket according to claim 11, further comprising beads surrounding the fluid-passing bores said beads being formed only on the inner thin metal plate.

* * * * *